UNITED STATES PATENT OFFICE.

GUILLAUME DE CHALMOT, OF LEAKSVILLE, NORTH CAROLINA, ASSIGNOR, BY MESNE ASSIGNMENTS, TO THE WILLSON ALUMINUM COMPANY, OF NEW YORK, N. Y.

SILICID OF IRON.

SPECIFICATION forming part of Letters Patent No. 602,975, dated April 26, 1898.

Application filed September 6, 1895. Serial No. 561,659. (Specimens.)

*To all whom it may concern:*

Be it known that I, GUILLAUME DE CHALMOT, a subject of the Queen of the Netherlands, (but having declared my intention of becoming a citizen of the United States,) residing in Leaksville, in the county of Rockingham and State of North Carolina, have invented certain new and useful Improvements in Silicids of Iron, of which the following is a specification.

This invention relates to ferrosilicids of twenty-five per cent. silicon and upward and having the formula $Si_2Fe_3$ or being an alloy of silicids having the formulæ $Si_2Fe_3$ and $Si_2Fe$.

I have discovered certain new ferrosilicids which are the products of the electric furnace. These silicids have the formulæ $Si_2Fe_3$ (silicid of approximately twenty-five per cent. silicon) and $Si_2Fe$, (silicid of approximately fifty per cent. silicon.) These silicids are as ordinarily produced mixed or alloyed in varying proportions, so that the proportion of silicon varies between twenty-five per cent. and fifty per cent. These ferrosilicids are sufficiently hard to scratch window-glass, but not so hard as to scratch the ruby or diamond. The silicid $Si_2Fe_3$ when pure is obtained in large crystals. The ferrosilicids of twenty-five to thirty per cent. of silicon are crystalline and white as silver. Those of forty to fifty per cent. of silicon are gray and crystalline. The lower grade silicids can be molten in a common furnace and can be cast readily, making exact and beautiful castings. They take a fine polish and do not tarnish in the air. All these silicids are very resistant to the action of acids and acid oxidizing agents, more so as the percentage of silicon increases. The low grades, however, are the more resistant against aqueous alkaline solutions.

The resistance of varying grades of ferrosilicids to acid oxidizing agents is shown by the following test: Three samples were pulverized and passed through a one hundred-mesh sieve and then treated with aqua regia for two days with frequent stirring, with this result:

| Sample. | Per cent. of silicon. | Per cent. dissolved. |
|---|---|---|
| A | 12.82 | 66.84 |
| B | 24.03 | 9.56 |
| C | 46.22 | 0.76 |

Sample A was of the richness of the highest grade commercial ferrosilicon, sample B was my silicid of nearly pure $Si_2Fe_3$, and sample C was my silicid compound chiefly of $Si_2Fe$.

My silicids are well adapted for use in all cases where metal is to be exposed to acids or acid oxidizing agents—for example, for anodes in electrolysis, for tubes and other vessels, sieves, gratings, &c., required in breweries, chemical factories, mines, &c. They are good electroconductors. The metal of from twenty-five to thirty per cent. silicon can on account of its brilliant color and stability in the air be used for making articles of luxury.

In order to produce these silicids, I take a silicon compound, as silica (sand) or a silicate, iron, or an iron compound, a carbonaceous reducing agent, and sometimes a flux, and mixing them together in proper proportions I heat them in an electric furnace fed by a sufficient electric current and for a suitable time to effect the reaction. The carbonaceous matter is wholly eliminated by reducing the silicon compound, and if an iron compound is used by reducing that also, so that the product consists of a substantially pure compound of silicon and iron having a greater or less proportion of silicon, according to the proportion of silica or other silicon compound used. I make no claim in this application to this electrical smelting process for producing these silicids, as this process is claimed in an application which I have prepared as divisional of my present application, being application, Serial No. 652,629, filed September 22, 1897.

I do not in this application claim specifically the fifty-per-cent. silicid $Si_2Fe$, as the same is claimed in my said divisional application.

I claim as my invention—

1. The described new ferrosilicid having the formula $Si_2Fe_3$, and containing approximately twenty-five per cent. of silicon.

2. The described new product being ferrosilicid containing upward of twenty-five per cent. of silicon, and consisting of a mixture in variable proportions of $Si_2Fe_3$ and $Si_2Fe$.

In witness whereof I have hereunto signed my name in the presence of two subscribing witnesses.

GUILLAUME DE CHALMOT.

Witnesses:
J. D. LANCASTER,
A. E. MILLNER.